Figure 1:
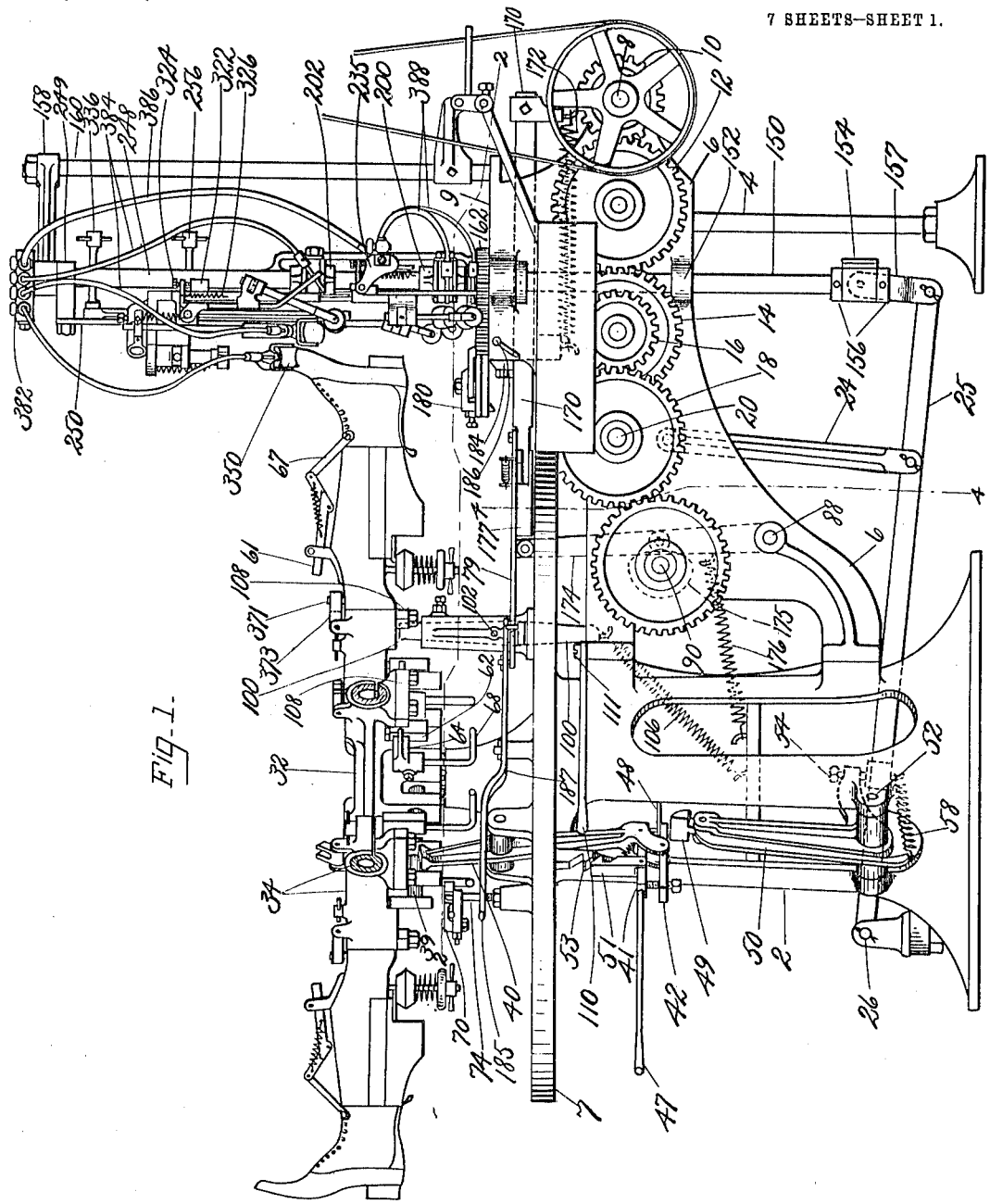

J. S. HANSEN.
MACHINE FOR IRONING BOOTS AND SHOES.
APPLICATION FILED FEB. 1, 1905.

1,081,907.

Patented Dec. 16, 1913.
7 SHEETS—SHEET 2.

WITNESSES.
Arthur R. Russell
Elizabeth C. Coyle

INVENTOR.
John S. Hansen
By his Attorney,
Nelson K. Howard

J. S. HANSEN.
MACHINE FOR IRONING BOOTS AND SHOES.
APPLICATION FILED FEB. 1, 1905.
1,081,907.
Patented Dec. 16, 1913.
7 SHEETS—SHEET 5.
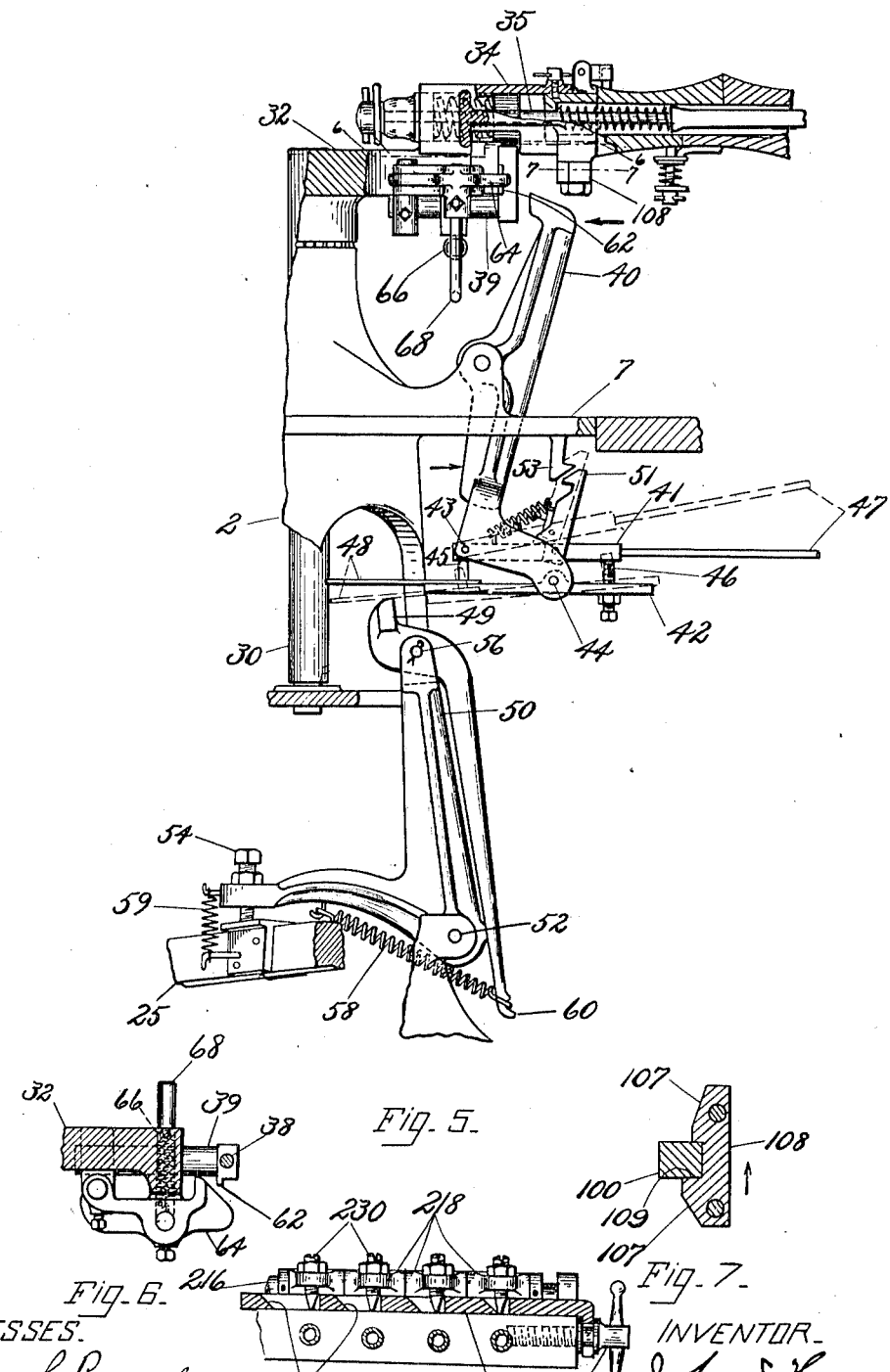

J. S. HANSEN.
MACHINE FOR IRONING BOOTS AND SHOES.
APPLICATION FILED FEB. 1, 1905.
1,081,907.
Patented Dec. 16, 1913.
7 SHEETS—SHEET 6.
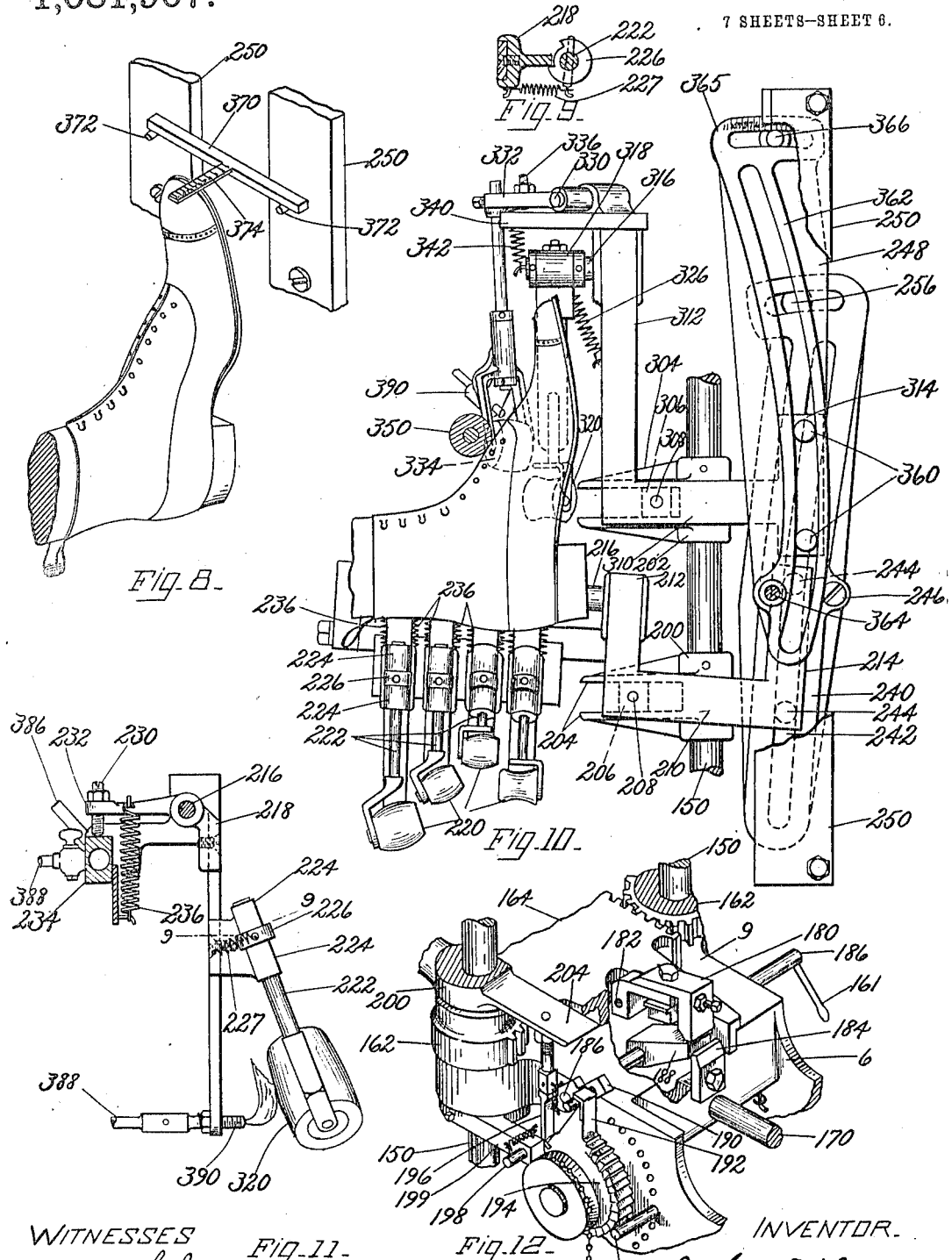

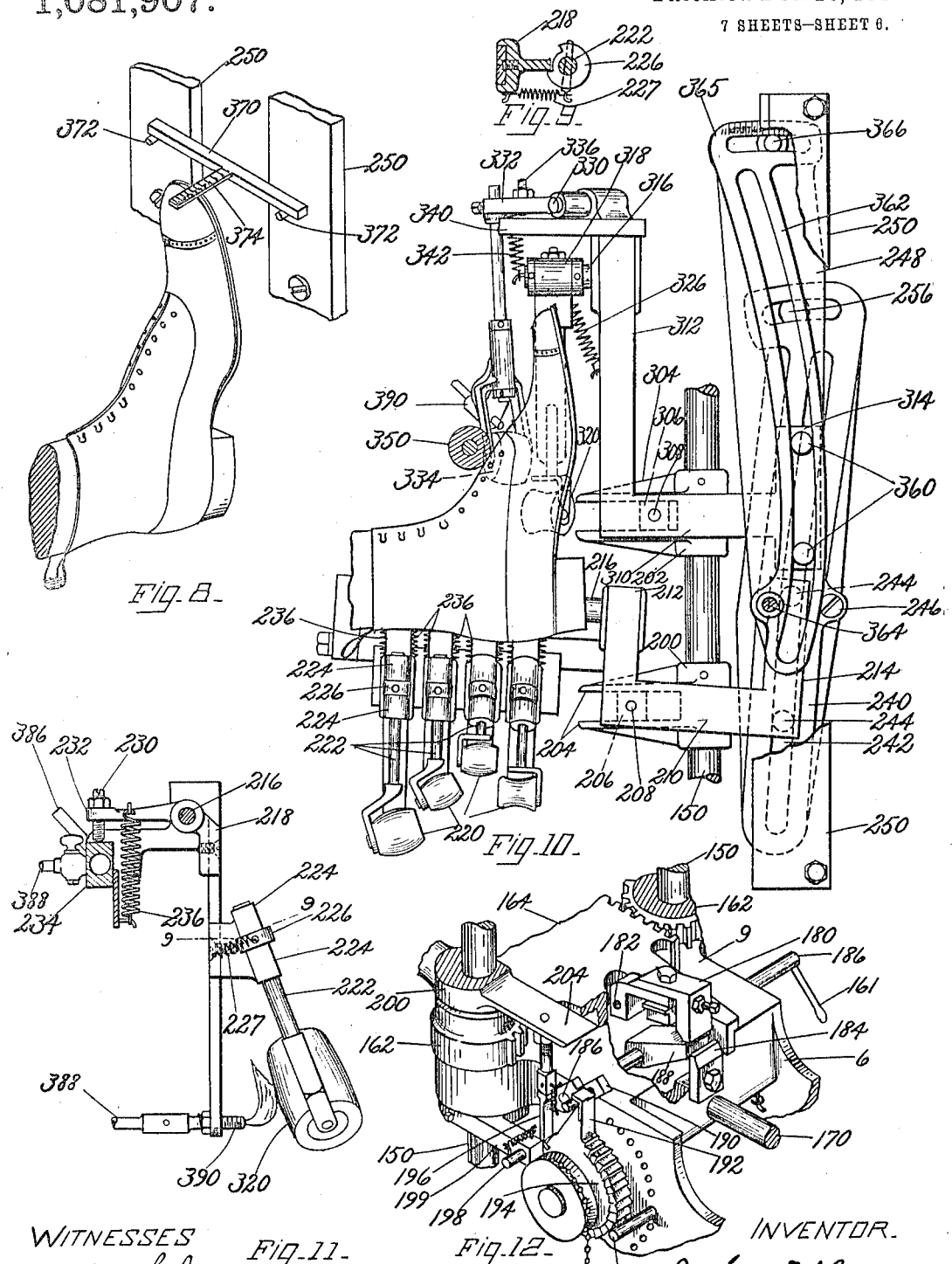

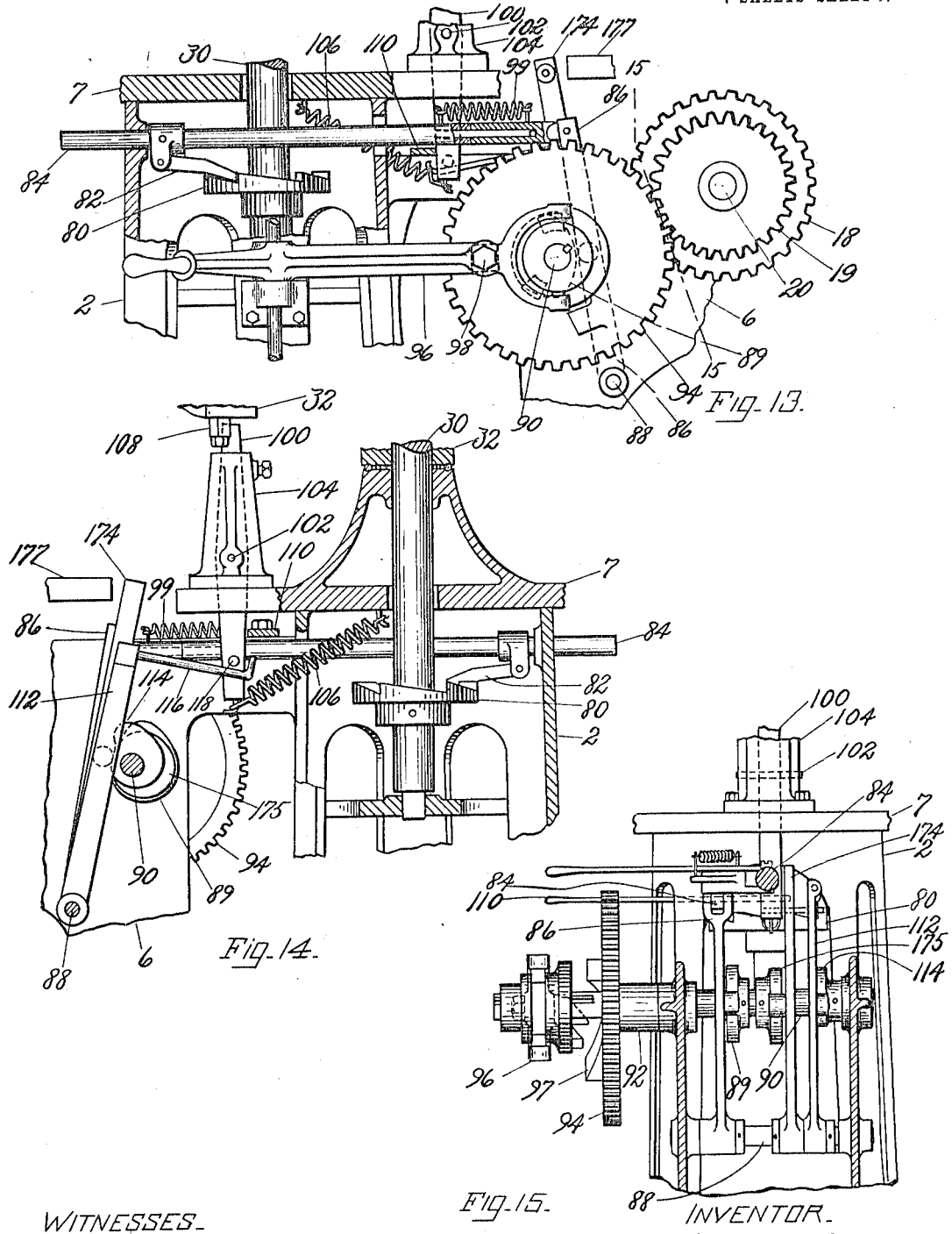

UNITED STATES PATENT OFFICE.

JOHN S. HANSEN, OF MEDFORD, MASSACHUSETTS, ASSIGNOR TO O. A. MILLER TREEING MACHINE COMPANY, OF PORTLAND, MAINE, A CORPORATION OF MAINE.

MACHINE FOR IRONING BOOTS AND SHOES.

1,081,907.   Specification of Letters Patent.   Patented Dec. 16, 1913.

Application filed February 1, 1905. Serial No. 243,690.

*To all whom it may concern:*

Be it known that I, JOHN S. HANSEN, a citizen of the United States, residing at Medford, in the county of Middlesex and Commonwealth of Massachusetts, have invented certain Improvements in Machines for Ironing Boots and Shoes, of which the following description, in connection with the accompanying drawings, is a specification, like reference characters on the drawings indicating like parts in the several figures.

This invention relates to machines for use in finishing boots and shoes, and particularly to machines for treating the uppers of boots and shoes. The upper of a boot or shoe gets more or less marred, wrinkled, and out of shape by reason of the frequent handling incidental to the several operations of making the shoe, and this is particularly so if the shoe is off the last during a considerable portion of the making operations. It is, therefore, the practice in finishing shoes to apply each shoe to an expansible tree which distends the shoe substantially to the shape of the last upon which it was made, and while the shoe is on the tree the upper is treated for effacing any wrinkles, marks, or lines which would detract from the appearance of the shoe and for smoothing the upper to restore the original finish of the leather and to cause the upper of the finished shoe to "stand up" and retain its shape. For thus finishing shoes machines have sometimes been provided with tools which were heated and sometimes with tools which were not heated, and for convenience it is customary to speak of machines in which the tools are not heated as "treeing machines" and to refer to machines in which the tools are heated as "ironing machines".

The present invention is herein shown as embodied in an ironing machine, although many features of the invention are applicable also to treeing machines.

The devices for treating the shoe are herein referred to as ironing devices or tools, the term "tool" being used in the claims to include heated devices adapted for use in ironing shoes as well as unheated devices used for treeing shoes.

A very important feature of the invention consists in improved mechanism for supporting and operating the tools employed for engaging shoes, said mechanism as herein shown comprising means for moving the tools toward and from operative position, and other means for moving the tools over a shoe while in operative position, the expressions "operative position" and "inoperative position" being used herein to designate operative and inoperative positions with reference to a shoe to be treated. Preferably the tools for treating one side of the shoe are mounted upon one support and the tools for treating the other side of the shoe are mounted upon another support, while actuating means is arranged for moving the two supports simultaneously for carrying the tools mounted upon them toward and from operative position. The movement of the tools toward and from operative position is preferably effected by moving the tools laterally with relation to the shoe, and as herein shown the supports are arranged to turn for swinging the tools laterally toward and from position to engage the shoe. If desired, the tools on one side only of the shoe may move toward or from operative position to permit the shoe to be placed in position to be treated and thereafter removed. The mechanism for moving the tools over the shoe is preferably arranged for reciprocating the supports together longitudinally of the shoe. As herein shown the sets of tools carried by each support are arranged in two groups, the upper group being adapted for treating the forepart of the shoe upper as the tools are reciprocated in operative relation to the shoe and the lower group for treating the rear part, including the leg, of the shoe upper. The tools, of which there are a plurality in each group, are so shaped and disposed that together they may cover substantially the entire upper of a shoe.

In order to enable the tools completely to treat the entire upper as they are moved over it said tools require to have other movements in the direction of the height of the shoe in addition to their reciprocations in the direction of the length of the shoe. To indicate the movement in the direction of the length of the shoe I have described the tools in the specification and claims as being moved "longitudinally of the shoe" and I have referred to the movement in the direction of the height of the shoe by the expression "transversely of the shoe." It is particularly important for those tools which engage the upper adjacent to the rand crease or angle between the sole and vamp to have this transverse movement because the bottom of the shoe has more or less longitudinal curvature or "spring" and said tools require therefore to be reciprocated in curved paths in order to treat the upper immediately adjacent to the rand crease throughout the length of the shoe. This movement transversely of the shoe is also important for the tool or tools which act upon the top of the forepart of the shoe from the toe to the instep, because in many styles of shoes the surface of this portion of the shoe varies with and conforms approximately to the spring of the shoe bottom so that for the best results the tools acting on this portion of the upper should be moved transversely of the shoe as they reciprocate over the shoe.

With these ends in view an important feature of the invention consists in providing improved means for moving the tools transversely of the shoe, or toward and from its sole, at the same time that they are reciprocated longitudinally of the shoe. As herein shown the tools of the upper and lower groups acting on each side of the shoe are mounted upon carriers which are movably sustained by the reciprocating supports and are caused to move on the supports transversely of the shoe as they are reciprocated. The movement of the tools transversely of the shoe is herein shown as effected by cam guides which are arranged to move the groups of tools in and out for causing them to follow paths approximately parallel to the rand crease of the forepart and the rearpart of the shoe. Preferably the tool carriers are mounted on their supports for both rocking and sliding movements transversely of the shoe, and preferably also the cam guides by which these movements are effected are arranged for adjustment to vary as desired the extent of the movements of the carriers and tools according to the amount of spring of different styles of shoes. As herein shown, the tools are yieldingly connected to their carriers whereby they may adapt themselves to the contour of the surface of the shoe engaged by them, and preferably also the tools are arranged to have a limited amount of free rocking movement sidewise to facilitate their adaptation to the surfaces being treated. I have herein shown the tools as rollers adapted to treat the upper by rolling pressure, and while I prefer to use rolling tools for ironing shoes, it is within my invention to use any usual or suitable form of tool according to the class of work to be treated.

A further feature of the invention consists in novel means for supporting the shoes and presenting them to the tools by which they are treated. As herein shown a plurality of expansible trees for supporting the shoes are carried by a turret which is adapted to be rotated for presenting each tree first to means for expanding the tree, then in position for the shoe to be treated by the ironing or other tools, and later to a device for releasing the locking means which has held the tree expanded, thus enabling the tree to collapse for facilitating the removal of the treated shoe and the application of another shoe.

Another feature of the invention consists in providing automatic mechanism for actuating the tree-expanding means whereby the workman is relieved of the labor heretofore necessary in expanding the trees to distend the shoes. This automatic mechanism is herein shown as comprising means adapted to be positioned at the will of the workman for rendering said mechanism operative.

Still another feature of the invention relates to automatic means for actuating the turret to move the trees toward and from operative positions with relation to the several means for acting on the trees and on the shoes carried by the trees. As herein shown the machine is provided with means for holding the turret from rotation whereby the trees may be retained in operative relations to the coöperating means, and connections are herein shown between a driven member of the machine and said retaining means whereby the turret is released to permit it to be turned. Connections are also herein shown between a driven member of the machine and the means for moving the ironing devices into operative position whereby when the turret has been rotated to present a shoe in position to be treated the ironing devices are automatically moved into operative position.

The construction and arrangement of the several parts of these portions of the invention constitute features of the invention which, together with other features, including certain details of the machine and combinations of parts thereof, will be set forth in the following description and pointed out in the claims.

Figure 2:
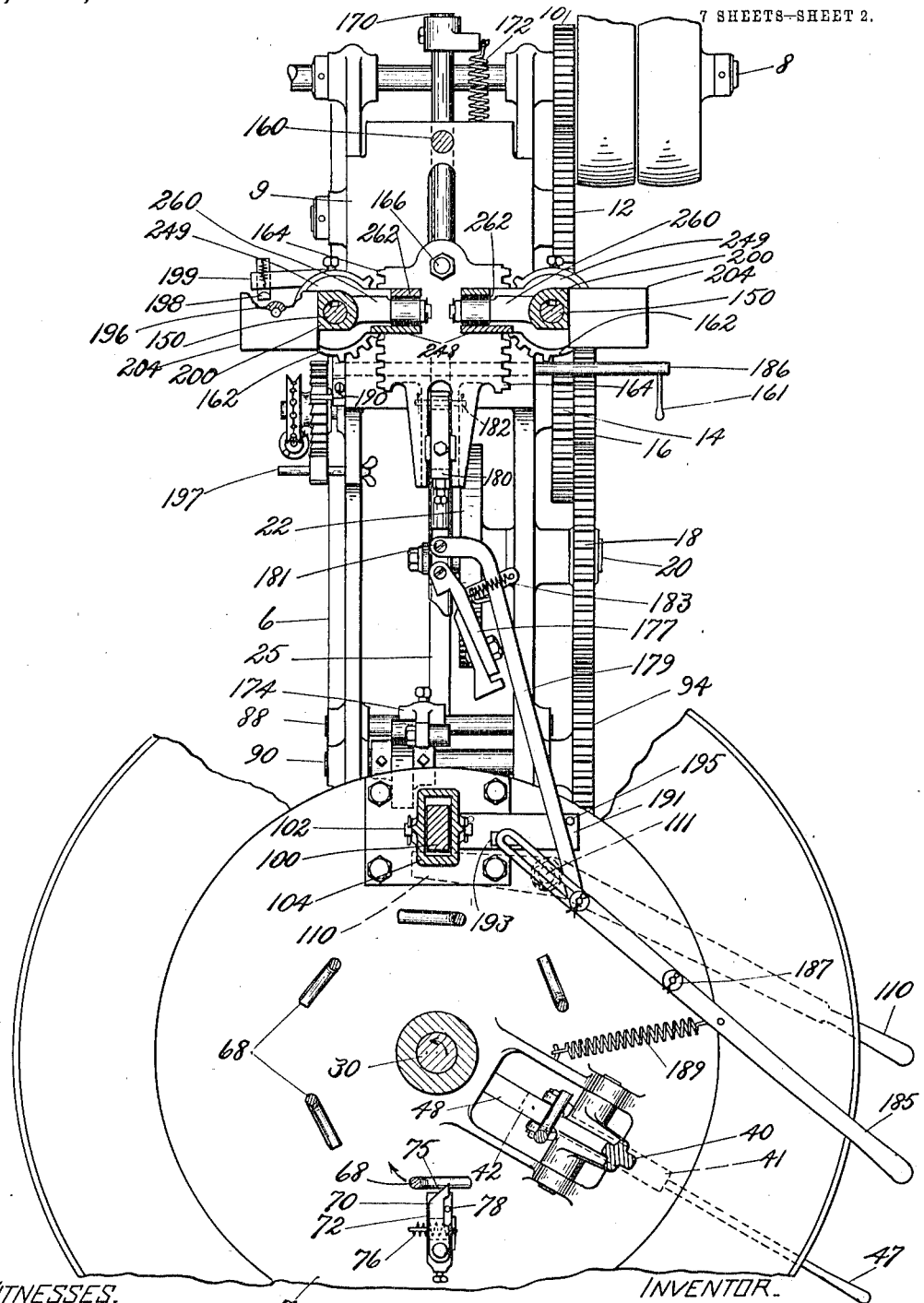
Figure 3:
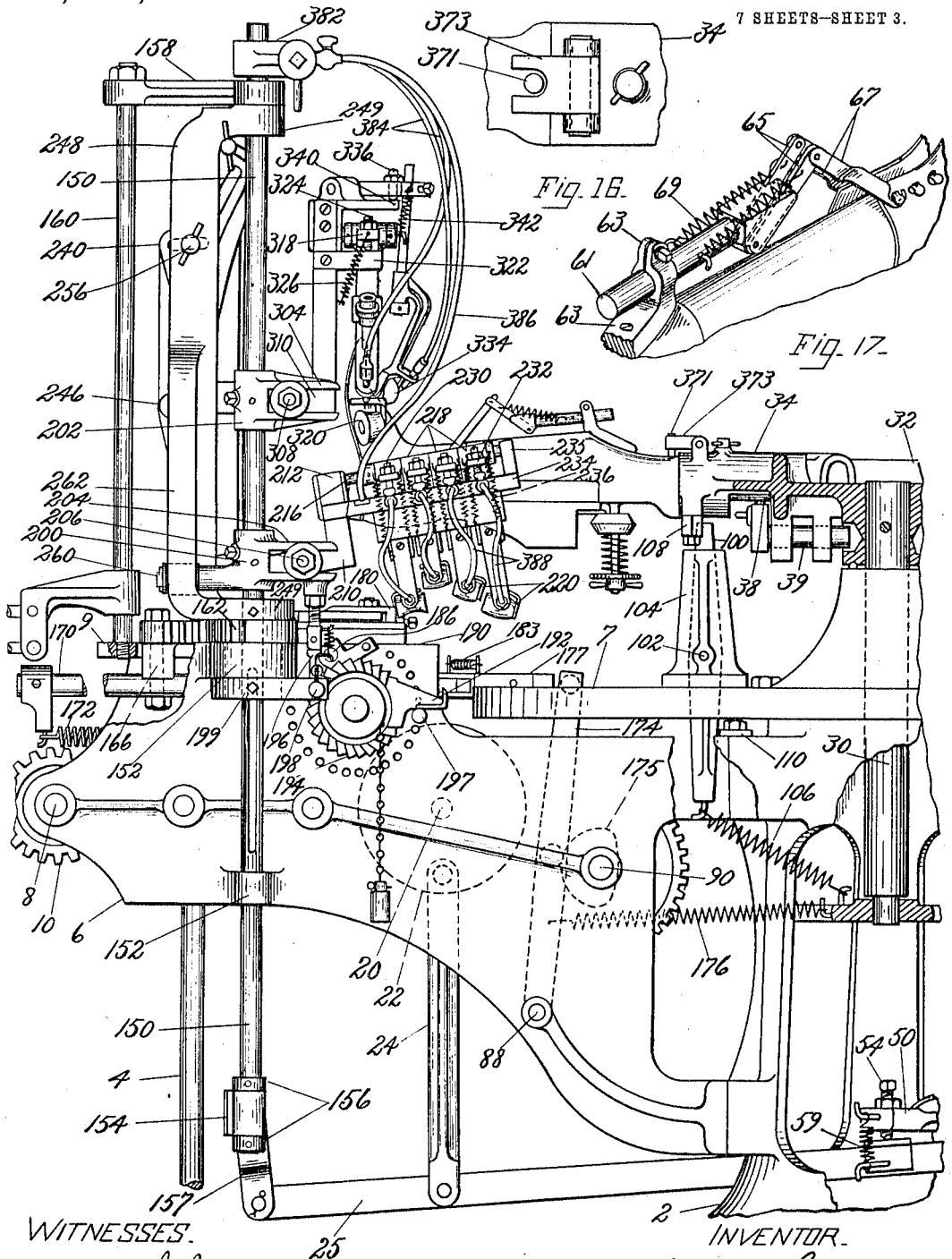
Figure 4:
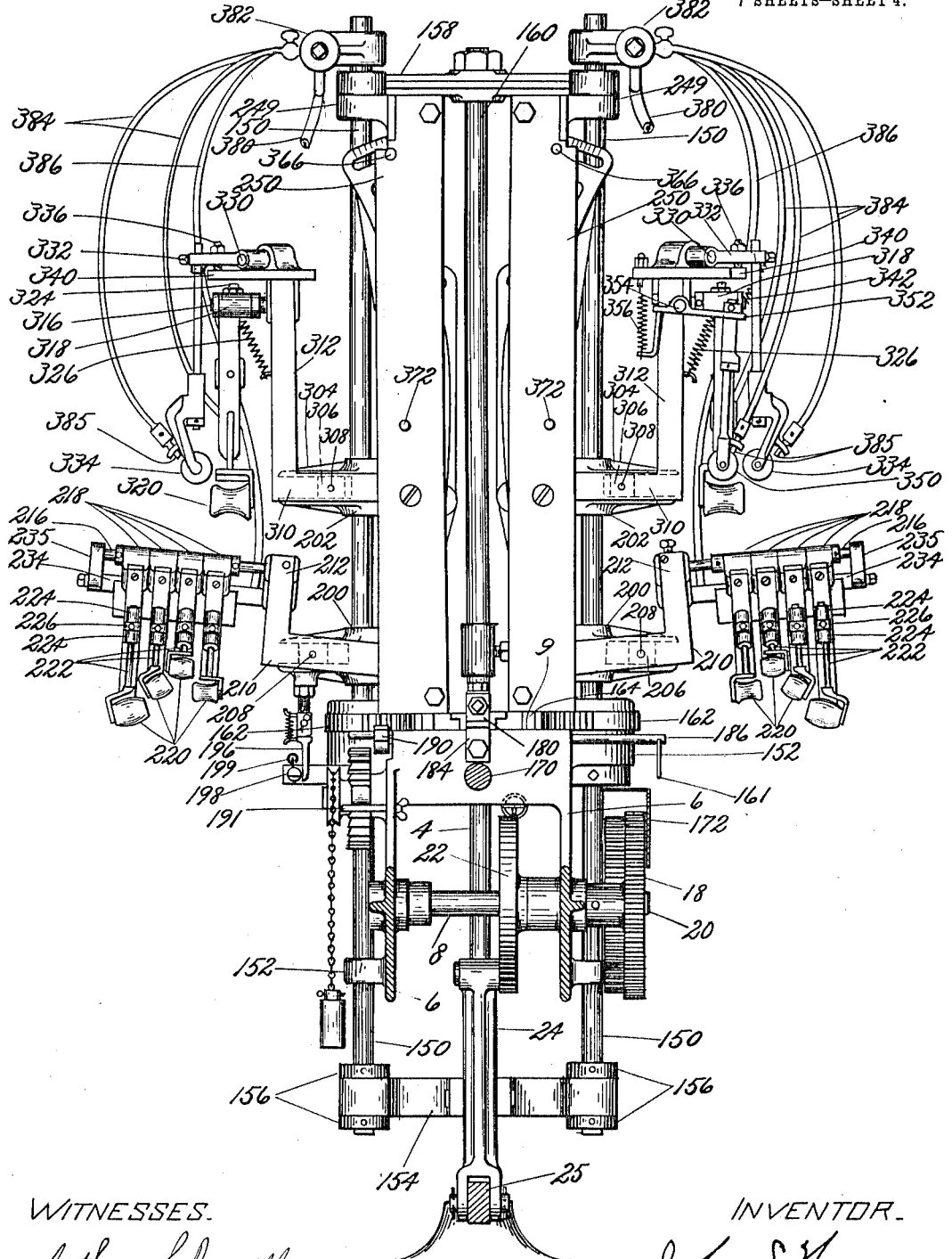

Figure 1 is a side elevation of a machine embodying the invention in a preferred form. Fig. 2 is a plan view of the machine taken below the dotted line 2—2 in Fig. 1. Fig. 3 is an elevation on a larger scale of the front portion of that side of the machine opposite to the side shown in Fig. 1. Fig. 4 is a view looking to the right in Fig. 1 from approximately the position indicated by the dotted line 4—4 in said figure. Fig. 5 is a detail view of the mechanism for expanding the trees. Fig. 6 is a view of the latch for locking a tree in expanded condition, the view being partly in section on the dotted line 6—6 of Fig. 5. Fig. 7 is a sectional view on the dotted line 7—7 of Fig. 5 and shows the means for restraining the turret from rotary movement while the shoe is being operated upon. Fig. 8 is a perspective view showing a detail which will be hereinafter described. Fig. 9 is a sectional view on the line 9—9 of Fig. 11. Fig. 10 is a side elevation showing in operative position with relation to the shoe the upper and lower groups of ironing devices for acting on one side of the shoe, together with the carriage levers upon which said groups of devices are mounted and the guiding cams for actuating said devices transversely of the shoe. Fig. 11 is a side elevation of one of the ironing devices and its holder. Fig. 12 is a perspective view showing details connected with the mechanism for swinging the sets of ironing devices toward and from operative relation to the shoe to be treated. Figs. 13, 14, and 15 are detail views of the mechanism for turning the turret to present the trees successively in position for the shoes carried by them to be operated upon. Fig. 16 is a detail view of means for holding a tree against rotary movement in the turret. Fig. 17 is a perspective view of the means employed for holding the leg portion of the shoe taut about the leg portion of the tree. Fig. 18 is a detail view showing means for rendering certain of the ironing devices inoperative.

The machine herein shown as embodying the invention has a main column 2 and a leg 4 which sustain a framework 6 and a table 7, the frame being provided with bearings for a driving shaft 8 upon which are mounted fast and loose pulleys. The driving shaft is connected by speed-reducing gears 10, 12, 14, and 16 with a toothed disk 18 secured to a short shaft 20 mounted in a bearing in the frame and provided on its inner end with a crank disk 22 from which depends a link 24 connected to a lever 25 which is pivoted at 26 to a lug on the column 2. The lever 25 is continuously vibrated by its connection with the crank disk in a vertical path for purposes which will later appear.

The column 2 is provided with bearings for a vertical shaft 30, see Fig. 3, upon which is secured a turret 32 having a plurality of radial socket members 34 to receive the shanks of the expansible trees which are employed for distending the shoes and for supporting the shoes while the ironing operation is being performed. The trees may be of any usual or suitable construction and those shown are of the well known type which are adapted to be expanded and contracted by means controlled by a longitudinally movable member, which is drawn out for expanding the tree and reversely moved by a spring for effecting the contraction of the tree. The said longitudinally movable member, which is indicated at 35 in Fig. 5, is connected by a pin 38 to the head of a guide rod 39. The turret may be turned to present the trees one at a time to an actuator 40, shown as a lever adapted to engage the head of the guide rod 39 for drawing outwardly the movable member 35 of the tree which is in position to be expanded.

The actuator 40 is shown as fulcrumed on the column 2 and is provided with means by which it may be operatively connected at times to a continuously oscillated operating lever and then automatically disconnected therefrom after the lever has made one stroke. To this end the actuator is herein shown as forked at its lower end to receive a plate 42, which is pivoted to the actuator at 44, the heavier end of the plate being at the back of the actuator, or the left hand side thereof, as seen in Fig. 5, so that said rear end of the plate will swing downwardly by gravity until the tail-piece 48 rests upon the head 49 of the operating lever 50 and the rear end of the plate is in the path of said head-piece 49. In this position of the parts the plate 42 connects the actuator to the operating lever for causing the former to be moved for expanding the tree. As it is desirable to expand a tree only at intervals and not at every oscillation of the lever, means is provided for holding the connecting plate 42 normally out of operative relation to the operating lever, and this means as herein shown comprises a plate 41 pivoted at its rear end to the actuator at 43 and adapted to rest by gravity upon an adjustable stop screw 46 upstanding from the plate 42. The weight of the plate 41 upon the stop screw holds the connecting plate 42 normally in the position shown in full lines in Fig. 5 with its stud 45 against the plate 41 and the rear end of the connecting plate out of the path of the operating lever. The plate 41 is provided with a handle 47 by which it may be manually lifted to allow the connecting plate to assume the dotted line position when it is desired to have the actuator moved for expanding a tree. Coöperating hooks 51 and 53 carried respectively by the plate 41 and the table 7 are arranged to hold the plate 41 in its raised position, until, during the oscillation of the lever and actuator, the plate has been moved to the right in Fig. 5 far enough to disengage the hooks automatically and on the return movement of the actuator the parts will resume the full-line position shown in Fig. 5. By means of this arrangement the actuator 40 may be connected with the lever 50 at the will of the workman and will remain in operative connection therewith until it has been actuated, whereupon it will be automatically disconnected from said lever at the end of one oscillation of the lever. The lever 50 is represented as a bellcrank lever having a vertical and a horizontal arm and fulcrumed at 52 on lugs extending from the column 2. The horizontal arm extends over the continuously vibrated lever 25 before described and is arranged to be rocked constantly by that lever. To this end the lever 25 and the horizontal arm are provided with a contact plate and an adjustable contact screw 54, the screw enabling the relative positions of the levers 25 and 50 to be adjusted and thereby the extent of movement imparted to the longitudinally movable members of the trees to be varied. It is found in practice to be desirable to introduce a yielding element into the mechanism by which the longitudinally movable members are actuated for expanding the trees, and as herein shown, this is provided by movably connecting the head-piece 49 to the lever 50. The head-piece is formed on the upper end of an arm which is pivoted to the lever 50 at 56 and extends downwardly below the fulcrum of lever 50 where it is engaged by one end of a spring 58, the other end of which is connected to the continuously vibrating lever 25 as shown in Fig. 1, or it may be connected to the horizontal arm of the lever 50, as shown in Fig. 5. The spring 58 permits the head-piece to yield in the event of excessive resistance to the expansion of a tree for distending a shoe preparatory to its being treated in the finishing operations.

It is desirable to provide means for holding the leg portion of the shoe taut about the leg portion of the tree while the shoe is being treated, and for this purpose I have provided means adapted to be connected to the front corners of the upper, as, for example, by means of the top lacing hooks or eyelets, for holding the upper under tension upwardly and forwardly. As herein shown, this means comprises a rod 61 longitudinally adjustable in a clamp 63 carried by the tree leg. To the front end of the rod are pivotally connected levers 65 carrying hook members 67. Springs 69 are connected at one end to the rod 61 and at the other end to the arms 65. The arrangement is such that the arms 65 extend at an angle to the rod 61 and the springs tend to turn the arms about their pivotal connection with the rod. This results in producing a tension upon the leg portion of the upper, pulling it upwardly and forwardly and thereby holding it taut both in the direction of the height of the shoe and in the direction of its length.

The device for holding the leg portion of the shoe in position upon the tree is not claimed herein, since it is claimed in a divisional application, Serial No. 310,759, filed April 9, 1906, which has matured into Patent No. 850,884, granted April 16, 1907.

In the machine herein shown as embodying the invention the means described for expanding the trees is located at one side of the mechanism for ironing the shoes so that a shoe may be applied to and distended by one tree while a shoe on a previously expanded tree is being treated by the ironing mechanism, and the rotatable turret enables the trees to be moved from operative relation to the expanding means into operative relation to the ironing mechanism. It is desirable for the best results that each shoe remain on the expanded tree for as long a time as is convenient in order that the shoe may better retain the shape of the tree. I have, therefore, provided means for locking each tree in expanded condition and holding the tree expanded while it is being moved and being treated by the ironing mechanism, and preferably until the shoe is to be removed and another shoe applied to the tree. To this end the head of the guide rod 39 is provided with a lateral lug 62, and a latch 64, see Figs. 5 and 6, is pivotally mounted on the turret 32 adjacent to each tree socket and is yieldingly held by a spring 66 in position to engage the lug 62 when the guide rod and the longitudinally movable member of the tree have been forced by the actuator 40 into position to expand the tree. The latch 64 is provided with a depending handle or operating member 68 by which it may be moved either manually or by engagement with a suitable stop for unlocking the tree and permitting it to be contracted. The spring 66 is shown as connected at one end to said member 68, while at its other end it is fixed to the turret 32.

For automatically unlocking the trees I have provided means shown in Fig. 2 arranged to act upon each tree while it is being moved into operative position with relation to the actuator 40. The means shown for this purpose comprises a stop 70 mounted on the head 72 of a post 74, see Fig. 1, and having a beveled stop face 75. The stop face 75 is located in position to engage the operating member 68 when a tree is moved toward the right in Fig. 2 past the stop, and to force said member in the direction for withdrawing the latch 64 from locking engagement with lug 62 on the head of guide rod 39. Preferably the stop 70 is pivotally mounted so that it may swing out of the path of the operating member 68 without withdrawing the latch 64 if a tree is moved toward the left, as may occasionally be desired in the use of the machine. The stop is acted upon by a spring 76, which holds it normally in operative position against a pin 78 on the post head 72. The operating members or handles are so positioned and are of such form that they may conveniently be grasped by the workman at any time to unlock a tree and permit it to collapse.

The turret carrying the trees may be turned either manually or by mechanism connected with the driving shaft. In the main figures of the drawings I have shown the turret as adapted to be turned by the operator, while in Figs. 13, 14, and 15 of the drawings I have disclosed one form of mechanism connected with the driving shaft for turning the turret. This mechanism includes a ratchet-faced disk 80 secured to the shaft 30 and provided with teeth equal in number to the trees supported by the turret. A pawl 82 adapted to engage the ratchet disk is mounted on a horizontally movable pawl carrier 84 connected to an arm 86, which is pivoted on a rod 88 supported in the frame 6 and is arranged to be actuated by a cam 89 on a cam shaft 90. The cam shaft is mounted in bearings in the frame 6 and supports a sleeve shaft 92, which, in the modification referred to, carries a gear 94 continuously driven by a pinion 19, see Fig. 13, secured to the shaft which carries the gear 18. The sleeve shaft or the face of the gear 94 is provided with one member of a clutch the other member of which is splined on the cam shaft 90 and is adapted to be moved into engagement with the continuously driven member by a manually controlled lever 96 and to be moved automatically out of engagement with said continuously driven member by an inclined lug 97 formed on the face of the gear 94 in position to engage a contact screw 98 carried by the lever 96. This arrangement enables the cam shaft 90 to be connected to the driven member at the will of the workman and given one rotation, after which it is automatically disconnected from the driven member and comes to rest. The pawl carrier 84 is shown as made in two sections yieldingly held together by a spring 99 through which the rotation of the turret is yieldingly effected.

Retaining means is provided for holding the turret stationary with one tree in operative relation to the actuator which expands it and another tree in operative relation to the tools for treating the shoe. The retaining means is herein shown as arranged to coöperate directly with that tree which is in position for the shoe carried by it to be treated, although it might obviously be located to act directly upon any other one of the trees or with any portion of the turret. The preferred embodiment of retaining means (see Figs. 1, 2, and 3) comprises an upright lever 100, which is fulcrumed at 102 and the upper arm of which extends through a guide 104 which braces the lever laterally, or against movement in the direction of travel of the trees. The lever is engaged at its lower end by a spring 106 which is connected to the frame and holds the upper end of the lever yieldingly pressed outwardly. Each tree has rigidly secured to its under side a block 108 in position to coöperate with the upper end of the lever 100 when the tree is in operative position with relation to the tools for treating the upper of the shoe carried thereon. As shown in the sectional view, Fig. 7, the block 108 is provided with inclined faces 107 to engage the lever and force it backwardly against the tension of spring 106 as the block and tree are swung toward the lever. The tree and block are normally moved in the direction of the arrow in Fig. 7, and the shoulder 109 formed by the rear side of the notch in the block is higher than the shoulder on the other side of the notch and constitutes a stop or abutment for arresting the movement of the turret and stopping it in desired position with one tree in its operative relation to the tools and another tree in its operative relation to the actuator 40. The retaining lever is caused by its spring 106 to seat itself in the notch of the block as soon as the trees come into their operative positions and the lever then holds the entire turret 32 from swinging movement in either direction until the lever is withdrawn. The retaining lever may be withdrawn manually to permit the movement of the turret, or it may be automatically actuated away from the block 108. For manually withdrawing the retaining lever a hand lever 110 (see Figs. 1 and 2) is fulcrumed on the frame at 111, the short arm of the hand lever being in position to engage the lower portion of the retaining lever while the long arm forms a handle located in convenient position to be grasped by the workman.

When the mechanism heretofore described for turning the turret is employed I prefer to use also mechanically operated means for withdrawing the retaining lever 100 to release the turret preparatory to its being turned. As herein shown a second arm 112 is pivoted on the rod 88 and arranged to be actuated by a cam 114 on the shaft 90. The arm 112 carries a hook 116 arranged to engage a stud 118 projecting laterally from the lower end of the lever 100. This mechanism for withdrawing the retaining lever and the mechanism for turning the turret are preferably used together, but it will be obvious that either of these mechanisms may be used without the other if desired.

In the embodiment of the invention herein shown the mechanism for treating the shoes upon the expanded trees includes two vertically reciprocating supports, shown as shafts 150 guided and adapted to have a limited amount of turning movement in bearings 152 in the end of the frame opposite to that at which the turret is located. The shafts extend at their lower ends freely through a cross head 154 and are provided with collars 156 by which they are held to the cross head to be reciprocated thereby. The cross head is connected by a link 157 to the continuously vibrating lever 25, by means of which the shafts and the mechanism carried thereby are constantly moved up and down. The shafts 150 are guided near their upper ends in a bracket 158, which is sustained by a post 160 seated in a platform 9, which connects the upper edges of the side portions of the frame 6 at this end of the machine. The shafts 150 support the tools for treating the shoe, these tools being herein shown as devices adapted to be heated for performing the operation of ironing the shoe, and are, therefore, sometimes referred to herein as ironing devices, although it will be understood that the invention is not dependent in any way upon the particular means employed for treating the shoe to finish it or upon the fact that the tools are heated. A separate set of ironing devices is carried by each shaft 150 and these sets of devices are arranged for treating simultaneously the opposite sides of a shoe located between them. The shafts and the ironing devices move up and down continuously, in the construction herein shown, and the shafts are adapted to be turned in opposite directions through a portion of a revolution, shown as approximately 90°. Turning movement of the shafts in one direction swings the two sets of ironing devices from a position adjacent to each other for operating upon a shoe located between them to a position which will permit the tree bearing the shoe which has been treated to be swung by the rotation of the turret away from position to be operated upon and a tree bearing another shoe to be brought into position to be operated upon. To this end each shaft is provided with a segment block or gear 162 connected to the shaft and formed integral with or secured to the lower end of a casting 248 fastened to the shaft and which extends parallel with the shaft and is provided at its upper end below the bracket 158 with a guide 249 for the shaft. Between the two segment blocks and in operative engagement with both of them is a rack bar 164 which is attached by a bolt 166 to a longitudinally movable rod 170 guided in bearings on the under side of the platform 9. The rod 170 and the rack bar 164 are normally held by a spring 172 in the position shown in Figs. 1 and 2, in which position the shafts 150 have been turned to move the sets of ironing devices away from each other to permit the turret to be swung, this position of the sets of ironing devices being hereinafter referred to as their inoperative position. The rod 170 and the rack bar 164 are reversely moved for turning the shafts to put the ironing devices into the position shown in Figs. 3 and 10, this position being herein referred to as their operative position, by a cam-actuated arm 174, see Figs. 1, 2, 3, and 15. The arm 174 is pivoted on the rod 88 before mentioned and is held by a spring 176 against an actuating cam 175 on the cam shaft 90. The upper end of the arm 174 is provided with a roll which is located in alinement with the rod 170 and in the rotation of the cam 175 may force the rod to the right in Figs. 1 and 2, whereby the shafts 150 are turned for swinging the ironing devices into their operative positions.

If the mechanisms heretofore described for releasing and turning the turret are employed the cam 175 will be so positioned on the shaft 90 with relation to the cams 89 and 114 that the ironing devices will be swung into their operative positions after the turret has been turned. If the said mechanisms are not employed then preferably the cam shaft will run constantly and the arm 174 will be continuously vibrated. For the purpose of causing the rod 170 to be actuated only at the desired times said rod will then be provided with a movable block 177 pivotally connected to the rear portion of the rod and normally held out of alinement with the rod 170 and arm 174, but adapted to be moved at the will of the operator into alinement with these parts for causing the rod to be actuated for swinging the ironing devices into operative position. For moving the block 177 into alinement with the rod 170 and arm 174 an arm 179 is pivoted at 181 to the rod 170 and is connected through a spring 183 with the block 177. The rear end of the arm 179 has a pin and slot connection with a hand lever 185 pivoted at 187 to the table of the machine. The hand lever and the parts with which it is connected are normally held by a spring 189 in the position shown in Fig. 2, but may be moved in opposition to said spring for swinging the arm and the block to the left in Fig. 2 to cause the block to occupy an operative position in alinement with the rod 170 and arm 174. It is desirable to employ means for retaining the block temporarily in its operative position, and to this end I have provided a plate 191 over which the rear portion of the arm 179 is adapted to be moved by the lever 185. On the plate 191 is arranged a stop 193 having an inclined outer face to enable the arm 179 to ride up over the stop as the arm is moved for swinging the block into operative position. The stop holds the arm 179 and the parts with which it is connected in the position to which they have been moved until the block 177 and rod 170 have been actuated forwardly by the arm 174. In such advance movement the arm 179 is carried forwardly beyond the stop 193, after which the spring 189 may move the parts into their normal positions shown in said Fig. 2. A stop 195 limits the movement of the parts in the direction in which they are impelled by said spring.

The rod 170 and rack bar 164 are automatically secured in the position to which they are moved by a locking device comprising a latch 180 pivoted at 182 (see Figs. 2 and 12) to the end of the rack bar nearest the turret. The latch is adapted to coöperate with a stop 184 secured to the platform 9 and is of sufficient weight to cause it to drop by gravity behind the stop when the rack bar has been moved into position for this movement to take place. I prefer to provide the machine with means for automatically releasing the latch 180 from the stop 184 to permit the spring 172 to move the rack bar 164 for swinging the ironing devices away from the shoe after the shoe has been treated during a predetermined number of reciprocations of said ironing devices.

As shown, a shaft 186 is provided with a tripping device 188 and has at one end a crank arm 190 which is adapted to be engaged and actuated for lifting the latch by an arm 192 of a ratchet wheel 194. The ratchet wheel is acted upon by suitable means, shown as a weight, for holding the arm 192 normally against a stop pin 197. The stop pin may be positioned in any one of a series of holes in the side of the frame 6 according to the number of reciprocations which it is desired to allow the ironing devices to make while in operative relation to the shoe being treated. The ratchet wheel is operated for moving the arm 192, from a predetermined initial position against the stop 197 into position for operating the latch, by means of a pawl 196 carried by one of the vertically reciprocating shafts 150, the pawl being arranged to turn the ratchet the length of one tooth for each reciprocation of the ironing devices. A locking pawl 198 is arranged to engage ratchet teeth formed on the side of the ratchet wheel and is carried by an arm 199 through which the shaft 150 moves in its reciprocations but which is arranged to be turned by said shaft to carry the pawl 198 out of engagement with the ratchet wheel when the ironing devices are turned out of operative relation to the shoe. The pawl 196 also is moved out of operative relation to the ratchet wheel when the shaft is thus turned. It will now be understood that the stop pin 197 will be positioned to expose to the action of the pawl 196 a number of ratchet teeth equal to the number of reciprocations it is desired to have the ironing devices make while in contact with the shoe. Thereafter whenever the rack bar 164 is actuated to turn the shafts 150 for swinging the ironing devices into operative position the pawl 196 and the locking pawl 198 will be brought into operative positions with relation to their respective sets of teeth on the ratchet wheel, and then during the reciprocations of the ironing devices the ratchet wheel will be turned step by step for moving the arm 192 toward the crank arm 190. During the last step of this movement of the ratchet wheel the arm 192 will engage the arm 190 and turn the shaft 186 for lifting the latch 180. As soon as the latch is lifted the spring 172 will move the rack bar in the direction for swinging the ironing devices into their inoperative positions, and then the turret may be turned for moving the treated shoe away and bringing another shoe into position to be treated. In the movement of the ironing devices toward inoperative position the pawl 196 and the locking pawl 198 are also moved out of operative relation to the ratchet wheel and the wheel is then moved backwardly by the weight referred to until its arm 192 engages the stop 197. The shaft 186 is provided with a handle 161 by means of which it may be manually turned for lifting the latch 180 and permitting the ironing devices to be swung from their operative position to their inoperative position at any time during the operation of the machine. If desired, the automatic means for releasing the latch to permit the ironing devices to move to inoperative position may be omitted and the operator will then release the latch at will by turning the handle 161.

The sets of ironing devices supported by the two shafts 150 and which act upon the opposite sides of the shoes are herein shown as duplicates of each other, except in a minor particular hereinafter referred to, and the several parts of these devices upon the two sides of the machine will be indicated by the same reference characters. Each shaft 150 supports two carriers 200 and 202 which are rigidly secured to the shafts to reciprocate and rotate with them. The carriers sustain lower and upper groups of ironing devices, the upper group of devices being arranged to act upon the forepart of a shoe and the lower group of ironing devices being arranged to act upon the rearpart, including the leg portion, of the shoe. The carrier 200 comprises a laterally projecting forked arm 204 which receives a rectangular slide block 206 (see Figs. 4 and 10), said slide block supporting a fulcrum pin 208 upon which is mounted a carriage lever 210. The carriage lever is formed with upwardly projecting arms 212 and 214 located at its opposite ends. From the arm 212 projects laterally a pivot rod 216 upon which are mounted the several holders 218 of the lower group of ironing devices 220. In the illustrated embodiment of the invention this group comprises four ironing devices, shown as rollers mounted to turn freely upon axles carried by stems 222. The stems 222 are shown as extending through lugs 224 on the holders and as provided between the lugs 224 with collars 226. Provision is made for permitting the stems to have a limited amount of rotary movement in the lugs in order to enable the ironing devices to position themselves according to the contour of the portion of the shoe engaged by them. To this end the collars 226 are rigidly secured to the stems and are provided with notches adapted to receive a relatively narrow stop on the holder. This construction is illustrated best in Figs. 9 and 11 and may be substantially the same for each holder. A spring 227 is employed in connection with certain of the ironing devices to hold them normally at one limit of their movement about the axis of their stems, said spring connecting the collar 226 with the holder, as shown in Figs. 9 and 11. The holders 218 are adapted to turn about the pivot bar 216, their movement in one direction being limited by stop screws 230 which are mounted in lugs 232 projecting laterally from the heads of the holders. The stop screws are adapted to engage the upper face of a bar 234 secured to the upper arm 212 of the carriage lever, the outer ends of the bar and the pivot rod being connected by a plate 235. Springs 236 are connected to the lugs 232 and to a fixed part, shown in Fig. 11 as a downward extension of the bar 234, and normally hold the stop screws against the bar 234. When the ironing devices occupy their operative position and are reciprocated in contact with the shoe the springs 236 hold the devices yieldingly against the shoe, but permit them to move relatively in accordance with the contour of the different portions of the shoe. The normal relative positions of the ironing devices of the group may be varied by adjusting the stop screws for causing the devices to act upon the shoe to the best advantage.

If it is undesirable to treat any portion of the shoe, as, for example, the upper portion or "quarter," or if the shoe to be treated is a low or Oxford shoe, provision is made for rendering one or more of the ironing devices inoperative. To this end a plate 237 may be mounted on the upper face of the bar 234 as shown in Fig. 18, said plate being provided with recesses in which normally the stop screws 230 are seated. The recesses increase in width from the right-hand end of the plate, viewing Fig. 18, toward the left-hand end and are provided on their rear or left-hand sides with inclined walls 239. An adjusting screw 241 is mounted in the end of the bar 234 and is provided with collars which permit it to rotate, but hold it against longitudinal movement in the downturned end of the plate. By manipulating the adjusting screw the plate may be moved to the right from the position shown in Fig. 18 to bring the inclined walls of the recesses into engagement with one stop screw after another and thereby raise the stop screws successively out of their recesses. By differently adjusting the plate 237 it may be made to support one or more, or even all of the ironing devices of a group of tools out of operative engagement with the shoe. For ironing low cut shoes it will usually be found desirable to adjust the plates 237 of both lower groups of tools to render inoperative all the tools of each lower group except the one which runs next to the rand crease.

The arm 214 of the carriage lever is acted upon by means which preferably slides the lever in the forked arm 204 and also rocks the lever about the pivot 208 transversely of the shoe during the reciprocation of the ironing mechanism. The sliding movement causes the ironing devices as they move over the upper to follow paths approximately parallel to the sole and the rand crease of the shoe whereby the ironing devices adjacent to the sole may act upon the upper close to the rand crease throughout their reciprocation. The rocking of the carriage lever causes the ironing devices to face at all times in the direction of their advance movement, so that they roll freely over the stock in curved paths instead of rubbing endwise, as they would do if the carriage lever had a sliding movement only in its carrier. It is to be noted that all of the ironing devices of each group partake of the sliding and rocking movements and therefore the relative lateral positions of the tools remain unchanged so that the upper may always be completely covered without the necessity of one tool overlapping the path of another to a large extent or incurring the risk of a gap being left between the paths of adjacent tools in any portion of their reciprocations. The ironing devices next the rand crease preferably are formed with acting faces shaped substantially as shown to adapt them to work into the rand crease of the shoe. The means for actuating the carriage lever 210 to move the ironing devices transversely of the shoe is herein shown as a fixed cam guide or plate 240 provided with a cam slot 242 which receives two studs 244 projecting laterally from the arm 214 of the carriage lever. The cam plate is attached by a bolt 246 to the casting 248 heretofore described as provided at its lower end with the segment gear 162 and at its upper end with the bearing 249, said casting being connected to the shaft 150 by means which permits the shaft to reciprocate relatively thereto, but causes the casting and the parts carried by it to turn with the shaft. The upper end of the cam plate is slotted and is adjustably secured in position by means of a clamping bolt 256. The plate may be adjusted about its pivotal connection at 246 according to the "spring" or longitudinal curvature of the bottom of the shoe being operated upon, thereby to cause the ironing devices to slide and rock with relation to the carrier more or less for acting properly upon shoes differing in shape. The carrier 200 is provided with an arm 260 (see Figs. 2 and 3), which extends into a guideway 262 formed in the casting 248 and insures that the carrier and the casting with its attached cam plates shall move together when the shaft 150 is turned.

The carrier 202 is secured to the shaft 150 above the carrier 200 and is provided with a similar forked arm 304 in which is guided a rectangular block 306, which supports the fulcrum pin 308 for the carriage lever 310 on which is mounted the upper group of ironing devices. The carriage lever 310 has vertically extending arms 312 and 314. The arm 312 supports a laterally projecting pivot rod 316 upon which is mounted the holder 318 for the ironing device 320 which is adapted to act upon the upper of the forepart of the shoe adjacent to the sole. A bar 322 (see Fig. 3) extends parallel to the pivot rod 316 and is adapted to be engaged by an adjustable stop screw 324 carried by a laterally projecting lug on the holder 318, said stop screw adjustably limiting the movement of the holder about the pivot rod in one direction. The holder is acted upon by a spring 326 for yieldingly pressing it toward the shoe as far as the stop screw 324 permits. The arm 312 of the carriage lever also supports a second pivot rod 330 upon which is mounted the holder 332 for an ironing device 334 which acts upon the side of the forepart of the shoe above the ironing device 320. The holder 332 is provided with a stop screw 336 for engaging a bar 340 to limit the movement of the holder about its pivot bar in one direction. A spring 342 is connected to the holder for pressing the ironing device 334 against the work.

As thus far described the groups of ironing devices upon the opposite sides of the machine are the same. One of the upper groups of ironing devices, herein shown as the group on the right-hand side of the machine viewing Fig. 4, comprises a third ironing device 350 for acting upon the middle portion of the forepart of the shoe, as indicated in Fig. 10. The ironing device 350 is carried on a holder 352 (see Fig. 4) mounted on a pivot rod 354 and pressed by a spring 356 yieldingly toward the work.

The arm 314 of the carriage lever 310 for the upper group of ironing devices is provided with studs 360 which stand in the slot of a cam guide or plate 362 and cause the lever to slide in the forked arm 304 and to rock about the pivot pin 308 for shifting the ironing devices in the direction of the height of the shoe as said devices are reciprocated vertically, whereby the ironing device 320 is caused to follow a path approximately parallel to the edge of the innersole in order that it may act upon the upper close to the rand crease throughout its travel. The cam plate 362 is connected at 364 to a plate 250, which is bolted to the casting 248 and spaced from the casting far enough to receive the two cam plates 240 and 362. At its upper end the cam plate is adjustably connected to the plate 250 by a clamping bolt 366 extending through a slot in the cam plate, as shown most clearly in Fig. 10. This provision for adjustment enables the cam plate to be differently positioned for the purpose of adapting the ironing devices to act upon shoes having varying degrees of spring or longitudinal curvature in the forepart. It is found in practice that it is not often necessary to adjust the cam plate which controls the lower group of ironing devices inasmuch as shoes differ little in the amount of spring in their rear portions. It is, however, quite frequently desirable to adjust the cam plate which controls the upper group of ironing devices because different styles of shoes differ much in the spring of their foreparts. For the purpose of facilitating the adjustment of the upper cam plate 362 I have provided a measuring device by means of which the relative spring of different shoes may be ascertained, the measuring device having a graduated scale corresponding to a scale on the cam plate. The measuring device is herein shown as a bar 370 adapted to be rested upon supports 372 carried by the plates 250 at about the level occupied by the toe end of a shoe when in position to be ironed. The bar 370 is provided with an arm 374 having marked upon it a graduated scale and a similar graduated scale is marked on the upper end 365 of the cam plate 362 in such position that the operator when making the adjustment of the cam plate can readily see the scale. The arrangement is such that proper adjustment of the cam plate will be effected by bringing adjacent to the edge of the plate 250 a number on the scale corresponding to that number on the arm 374 which is nearest to the plane of the toe of the sole.

The ironing devices are shown as heated by gas flames, the gas being delivered by tubes 380 from a suitable source of supply to distributers 382 carried on the upper ends of the shafts 150. From thence extend tubes 384 to the burners 386 located adjacent to the ironing devices of the upper groups. A tube 386 extends from the distributer 382 to the bar 234, which is chambered out as shown in section in Fig. 11 and serves as a distributer from which extend tubes 388 to the burners 390, which are arranged to direct a flame against the ironing devices of the lower group. Stop cocks are provided by means of which the gas can be shut off from any tool which it is not desired to heat.

The shank portions of the trees which are received in the radial socket members 34 of the turret are cylindrical to enable the trees to be turned for facilitating the application of the shoes to the trees and also any hand operations which it may be desired to perform upon the shoes while they are on the trees. It is desirable to restrict the turning movement of the tree at certain times—as, for instance, when the shoe is being treated by the ironing devices—and to this end each tree is provided on its upper face with a stud 371 adapted to be engaged by a forked latch 373 pivotally mounted on the socket member of the turret. Preferably and as shown, the stud and forked latch fit loosely so as to enable the tree to have a slight turning movement to permit it to adapt its angular position to the pressure of the ironing devices.

In the use of the machine the tree is automatically unlocked by the device 70, to enable it to contract, or it may be unlocked manually by pulling upon the downwardly extending member 68 of the latch 64. When the tree has been contracted the workman applies to the tree a shoe to be treated, turns the latches 373 into operative engagement with the studs 371, and secures the hooks 67 to the front corners of the shoe upper for holding the leg portion of the shoe taut on the tree. The handle 47 is then lifted to put the plate 42 into the path of the head-piece 49 of the lever 50, which is actuated by the continuously vibrating lever 25. This causes the actuator 40 to be moved for expanding the tree and distending the shoe. If the mechanism shown in Figs. 13, 14, and 15 is employed for rotating the turret the lever 96 will be actuated for starting the cam shaft 90 and the arm 112 will be actuated by its cam 114 for withdrawing the retaining lever from engagement with the block 108 on the turret, and the pawl carrier 84 will then be moved in the direction for turning the turret. When a tree having a shoe applied to it reaches position to be operated upon by the ironing devices the lever 185 will be moved for putting the block 177 into the path of the cam arm 174 by which the rack bar 164 is actuated for swinging the ironing devices from their inoperative position to their operative position. The ironing devices, it should be understood, are herein shown as reciprocated all the time by the continuously vibrating lever 25, and after they have been turned into operative position they will move up and down over the shoe and will simultaneously be guided inwardly and outwardly by the cam plates 240 and 362 for causing the devices of the lower and upper groups to follow paths approximately parallel to the rear and front portions, respectively, of the rand crease or the sole of the shoe. The ironing devices preferably are so arranged that collectively they act upon the entire shoe upper from end to end and from the sole to the top portion to be treated. When the ironing devices have made the number of reciprocations in contact with the shoe which has been predetermined by the position of the stop pin 197 the latch 180 will be disengaged from the stop 184 and the spring 172 will move the rack bar 164 for swinging the ironing devices into their inoperative positions. The tree held by the retaining lever 100 in position for its shoe to be treated will next be released by withdrawing the lever 100 from its engagement with the block 108, and the turret will then be turned for moving away from operative position the tree having the shoe last treated and for moving into operative position the tree bearing the shoe next to be treated. If the shoe to be treated is a low cut or Oxford shoe the slides 237 may be adjusted to hold out of operative relation to the shoe those ironing devices of the lower groups which are not required. Also if a portion of the shoe upper, as, for example, the quarters or the quarters and the rear portion of the vamp, consist of leather or other material which it is undesirable to treat with heated ironing devices the gas flame may be turned off from the devices which act on such portions of the upper, or the slides 237 may be adjusted to hold such devices out of contact with the shoe. It is also to be understood that any other tools may be substituted for the roll shown, as, for example, rubbing tools which may be heated for ironing the uppers or used without artificial heat for treeing the shoe uppers.

Having set forth the nature of my invention and described the construction and operation of one form of machine embodying the invention, I claim as new and desire to secure by Letters Patent of the United States:—

1. In a machine for treating the uppers of shoes, a plurality of tools, means for reciprocating said tools in contact with the shoe, and means for moving said tools laterally away from the side of the shoe to put them into inoperative relation to the shoe.

2. In a machine for treating the uppers of shoes, a plurality of yieldingly mounted tools, a support for said tools, means for reciprocating said support longitudinally of the shoe with the tools in contact with the shoe, and means for moving the support in a direction at an angle to the direction of its reciprocation for shifting the tools toward and from position to operate upon the shoe.

3. In a machine for treating the uppers of shoes, tools for treating the shoe, means for moving said tools laterally with respect to the sides of the shoe toward and from position to engage the shoe, and means for reciprocating the tools longitudinally of the shoe while in contact therewith.

4. In a machine of the class described, tools for treating the upper of a shoe, a support for said tools, means for actuating said support to reciprocate the tools longitudinally of the shoe, and means for turning said support to swing the tools toward and from operative position with relation to the shoe.

5. In a machine of the class described, sets of tools for simultaneously treating a shoe upon its opposite sides, means for reciprocating said tools in contact with the shoe, and means for simultaneously moving said sets of tools laterally with relation to the side of the shoe, in opposite directions toward and from position to operate upon the shoe.

6. In a machine of the class described, the combination with tools for treating the upper of a shoe presented between them, of a support upon which the shoe is mounted for movement toward and from position to be treated, and means for swinging the tools away from the shoe to permit the shoe to be moved toward or from position to be treated.

7. In a machine for treating the uppers of shoes, the combination with sets of tools located upon opposite sides of the machine and adapted to treat a shoe presented between them, of a support upon which the shoe is mounted for movement toward and from position to be treated, and means for swinging said sets of tools away from the shoe to permit the shoe to be moved toward or from position to be treated.

8. In a machine of the class described, a laterally movable tree for presenting shoes in position to be operated upon, sets of tools for treating opposite sides of the shoe, and means for moving one of said sets of tools laterally from the side of the shoe out of the path followed by the tree in its movement toward and from position for the shoe to be operated upon.

9. In a machine of the class described, trees for holding shoes to be treated, means for supporting said trees for horizontal movement toward and from position for the shoes to be operated upon, sets of tools adapted to treat opposite sides of a shoe, and means for moving said sets of tools laterally away from the side of the shoe for putting them out of operative position to permit movement of one tree away from the position occupied by it while its shoe was being treated and movement of another tree toward position for its shoe to be treated.

10. In a machine of the class described, two sets of tools for treating a shoe on its opposite sides, means for actuating said tools, and means adapted to be rendered operative at the will of the workman for simultaneously moving said two sets of tools laterally in opposite directions relatively to the sides of the shoe to shift them toward or from position for treating the shoe.

11. In a machine for treating the upper of a shoe, a plurality of tools for engaging the same side of the shoe, a support for said tools, means for reciprocating said support longitudinally of the shoe, and means for actuating the tools together transversely of the shoe while they are moving longitudinally of the shoe, said tools being constantly subject to the control of said transversely actuating means.

12. In a machine for treating the upper of a shoe, a plurality of tools, a carriage for said tools, a support for the carriage, means for reciprocating the support longitudinally of the shoe, and means for simultaneously sliding the carriage and tools forth and back transversely of the shoe during each reciprocation of the support.

13. In a machine for treating the upper of a shoe, a plurality of tools, a carriage for the tools, a support for the carriage, means for reciprocating the support longitudinally of the shoe, and means for rocking the carriage forth and back to move the tools transversely of the shoe during each reciprocation of the support.

14. In a machine for treating the upper of a shoe, a plurality of tools for acting on the same side of the shoe, means for actuating the tools longitudinally of the shoe, and means constantly controlling the tools to guide them in similar paths approximately parallel to the rand crease of the shoe.

15. In a machine for treating the uppers of shoes, a plurality of tools for acting on the same side of the forepart of a shoe, means for actuating said tools longitudinally of the shoe, and guiding means common to all of said tools for causing all said tools to follow paths approximately parallel to the rand crease of the forepart of the shoe.

16. In a machine for treating the upper of a shoe, a plurality of tools, a carriage therefor, a support upon which the carriage is mounted for rocking and sliding movements, and means for actuating said support and carriage to move the tools in paths approximately parallel to the rand crease of the shoe.

17. In a machine for treating shoe uppers, a plurality of tools for acting on the same side of the shoe, means for sustaining the tools, and actuating mechanism for moving all the tools in paths approximately parallel to the rand crease of the shoe, said actuating mechanism comprising means adapted to be adjusted for varying the paths of the tools according to the spring of the shoe being treated.

18. In a machine for treating the upper of a shoe, a plurality of tools, a carriage for said tools, a support upon which the carriage is movably mounted, means for reciprocating the support longitudinally of the shoe, a cam, and connections between the carriage and the cam whereby the carriage is moved on the support for causing the tools to follow, in their reciprocation, paths which are approximately parallel to the rand crease of the shoe.

19. In a machine for treating the upper of a shoe, separate groups of tools for engaging the forepart and the rearpart of a shoe, means for sustaining said groups of tools, means for actuating the groups of tools longitudinally of the shoe, and means for guiding the groups of tools in paths approximately parallel respectively with the rand crease on the forepart and the rand crease on the rearpart of the shoe.

20. In a machine for treating the upper of a shoe, groups of tools for engaging the forepart and the rearpart of a shoe, means for sustaining said groups of tools, and means for actuating the groups of tools in paths approximately parallel respectively with the rand crease on the forepart and the rand crease on the rear part of the shoe, said means comprising relatively adjustable cams for independently varying the paths followed by the different groups of tools.

21. In a machine for treating the uppers of shoes, a group of tools for acting upon the top and side faces of the forepart of a shoe, a group of tools movable lengthwise of the shoe for acting upon the side faces of the rearpart of the shoe, a support to which said two groups of tools are permanently connected, and means for actuating said support to reciprocate the two groups of tools simultaneously.

22. In a machine for treating the upper of a shoe, a group of tools for acting upon the top and side faces of the forepart of a shoe, a group of tools for acting upon the side faces of rearpart of the shoe, a support on which said two groups of tools are mounted, means for actuating said support to reciprocate the groups of tools simultaneously, and means for independently moving the groups of tools transversely of the shoe during their reciprocations.

23. In a machine of the class described, sets of tools adapted to treat the opposite sides of a shoe, each set of tools comprising a group of tools adapted to treat the top and sides of the forepart and a group of tools adapted to treat the sides of the rearpart of the shoe, said two groups of tools being relatively fixed lengthwise of the shoe, and means for simultaneously moving said two sets of tools in the same direction over the shoe.

24. In a machine for treating the upper of a shoe, supports arranged upon opposite sides of the machine, upper and lower groups of tools mounted on said supports for acting respectively on the forepart and the rearpart of the shoe, means for reciprocating the supports together longitudinally of the shoe, and means for independently actuating the upper and lower groups of tools transversely of the shoe.

25. In a machine of the class described, a tree movable toward and from position for the shoe carried by it to be operated upon, sets of tools for treating opposite sides of the shoe, and means for moving one of said sets of tools away from the shoe in the same plane as the tree is movable but in a different direction to remove that set of tools from the path followed by the tree in its movement.

26. In a machine of the class described, tools for treating the upper of a shoe, a holder, and a connection between the holder and the tools comprising a pivot shaft having a stop and a sleeve having faces to be engaged by the stop and arranged to permit the tools to rock sidewise to adapt themselves to the contour of the work engaged by them.

27. In a machine of the class described, the combination with tools for treating the upper of a shoe and a holder from which the tools are suspended by their shanks, of connections between the holder and the tools arranged to permit the tools to rock sidewise, and means for holding the tools normally at one limit of their rocking movement.

28. In a machine of the class described, the combination with a tree for supporting a shoe, of tools for treating the shoe, means for moving the tools from an inoperative position to an operative position with relation to the shoe, means for locking the tools in operative position, and other means for actuating the tools over the shoe.

29. In a machine of the class described, the combination with a tree for supporting a shoe, of tools for treating the shoe, means for moving the tools from an inoperative position to an operative position with relation to the shoe, means for locking the tools in operative position, means for actuating the tools over the shoe in a different direction from their movement toward operative position, and other means for automatically releasing the locking means to permit the return of the tools to inoperative position.

30. In a machine of the class described, the combination with a tree for supporting a shoe, of tools for treating the shoe, means for moving the tools from an inoperative position to an operative position with relation to the shoe, means for locking the tools in operative position, continuously operating means for actuating the tools in the direction of their working movements, means adapted to be actuated manually for releasing the lock, and means for moving the tools out of operative position.

31. In a machine for treating the upper of a shoe, a plurality of tools, means for reciprocating said tools in contact with the shoe, and a single device capable of adjustment for rendering one or more of the tools inoperative while the other tools continue to operate.

32. In a machine for treating the upper of a shoe, a group of tools for engaging the shoe, means for sustaining said group of tools, continuously operating means for actuating the group of tools over the shoe to treat the shoe, and means adapted to be rendered operative or inoperative while the machine is running for holding one or more of said tools out of operative relation to the shoe.

33. In a machine of the class described, tools for treating the upper of a shoe, a carriage upon which the tools are pivotally mounted, yielding means for pressing the tools toward the shoe, and adjustable means arranged to act upon a plurality of tools successively for positioning one or more tools out of operative relation to the shoe.

34. In a machine for treating the upper of a shoe, a group of tools adapted to be actuated over the shoe, and means comprising a slide arranged to be adjusted for moving one or more of the tools of the group out of operative relation to the shoe.

35. In a machine for treating the upper of a shoe, a group of tools adapted to be actuated over the shoe, stop screws for determining the normal relative positions of the tools, a slide plate for engaging said stop screws, and means for adjusting said plate to cause the tools to be moved successively out of operative positions.

36. In a machine of the class described having a tree for supporting a shoe, tools for treating opposite sides of the shoe, means for laterally moving the tools into operative position with relation to the shoe, and other means for reciprocating the tools lengthwise of the shoe to treat the shoe.

37. In a machine of the class described having a tree for supporting a shoe and tools for treating the shoe, means for actuating the tools lengthwise of the shoe over the upper, and independent means for laterally moving the tools out of operative position with relation to the shoe.

38. In a machine of the class described having a tree for supporting a shoe and tools for treating the shoe, means for moving the tools into operative position with relation to the shoe, means for holding the tools in operative position, and other means for actuating the tools over the shoe.

39. In a machine of the class described having a tree for supporting a shoe and tools for treating the shoe, means for moving the tools into operative position with relation to the shoe, means for securing the tools in operative position, means for actuating the tools to treat the shoe, automatic means for releasing the tools to permit them to be moved away from the shoe and additional means by which the tools can be moved away from the shoe.

40. A machine of the class described, comprising a tree for supporting a shoe, tools for treating the shoe, yielding means for moving the tools away from the shoe, mechanism for moving the tools at the will of the workman into operative position with relation to the shoe, a latch to retain tools in operative position and other mechanism for actuating the tools over the shoe, said machine having provision for manually actuating the latch to permit said yielding means to move the tools out of operative position at the will of the workman.

41. In a machine of the class described, tools for treating a shoe, mechanism for moving the tools toward and from operative position with relation to the shoe, and additional mechanism for continuously moving the tools longitudinally of the shoe.

42. In a machine of the class described, an expansible tree, an actuator for expanding the tree, an automatically operated member, and means adapted to be rendered operative at the will of the workman for connecting the actuator with the automatically operated member to expand said tree.

43. In a machine of the class described, an expansible tree, an actuator for expanding the tree, a continuously oscillating lever, means adapted to be rendered operative at the will of the workman for connecting said actuator and the lever, and means for automatically disconnecting the actuator and lever after one oscillation of the lever.

44. In a machine of the class described, an expansible tree, an actuator for expanding the tree, a continuously moving member, a device for connecting said actuator and said member, and controlling means therefor adapted to be operated at the will of the workman to cause the device to connect the actuator and said member, said controlling means being arranged for rendering the connecting device inoperative when a tree has been expanded.

45. In a machine of the class described, the combination with an expansible shoe holder, of an automatically operated member, and mechanism arranged to be rendered operative at the will of the workman for connecting said member with said holder to expand said holder, said mechanism including a yielding element whereby said expanding action is yieldingly effected.

46. In a machine of the class described, an expansible tree, an actuator for expanding the tree, and an operating lever provided with a head-piece pivoted to the lever for engaging the actuator and having an arm extending parallel to the lever and yieldingly connected thereto.

47. In a machine of the class described, the combination with tools for treating a shoe, of a shoe supporting tree movable toward and from position in which the shoe is treated, and means for automatically moving the tools laterally away from the sides of the shoe to put them into an inoperative relation to the shoe.

48. In a machine of the class described, a rotatable turret, a plurality of trees carried by said turret, means for expanding each tree, a latch for locking the tree in expanded condition, a handle connected with said latch for manually unlocking the tree at the will of the workman, and means constructed and arranged to actuate the latch for automatically unlocking the tree when the turret is moved in one direction and to be swung out of the path of the latch by the movement of the tree in the opposite direction.

49. In a machine of the class described, the combination with a shoe tree and mechanism for treating a shoe on the tree, of a support upon which the tree is rotatably mounted for movement toward and from operative relation to said mechanism, a recessed block movable with the tree, a lever, means for holding the lever normally in position to engage the block for securing the tree in operative relation to said mechanism, and manually controlled means to set in operation automatic mechanism for separating the block and the lever and causing the tree to be moved out of operative relation to said mechanism.

50. In a machine of the class described, the combination with a shoe tree and mechanism for treating a shoe on the tree, of a rotatable turret for supporting the tree, a block carried by the turret and provided with a stop face, an incline of less height than the stop face, and a recess between said face and incline, a lever normally held in the path of said incline and adapted to ride over it into the recess for checking and then locking the tree in operative position with relation to said mechanism, and means for rocking the lever away from the block to permit the tree to be moved out of operative relation to said mechanism.

51. In a machine of the class described, the combination with a shoe tree and mechanism for ironing a shoe on the tree, of a support upon which the tree is mounted for movement toward and from operative position with relation to said mechanism, means for retaining the tree in operative position, a hand lever for actuating the retaining means to free the tree at the will of the workman and automatic mechanism adapted to be rendered operative at the will of the workman for withdrawing said retaining means and then moving the tree out of operative position with relation to said ironing mechanism.

52. In a machine of the class described, a plurality of tools for treating a shoe, means for reciprocating said tools lengthwise of the shoe in contact with the upper, and automatically operating means for moving the tools laterally with relation to the side of the shoe to position them away from the shoe.

53. In a machine of the class described, a plurality of tools for treating a shoe, means for reciprocating said tools lengthwise of the shoe in contact with the upper, and means for automatically moving the tools laterally with relation to the side of the shoe to position them away from the shoe after a predetermined number of reciprocations of the tools.

54. In a machine of the class described, the combination of a movable turret, a plurality of trees supported by said turret and each arranged to hold a shoe, expanding mechanism for said trees, means for ironing the shoes supported by said trees, a constantly driven member, and means controlled by the workman for connecting said turret to said member to cause the member to move the turret and thereby to move the trees toward or from operative position with relation to said ironing means and said expanding mechanism, said connecting mechanism including yielding means through which said movement of the turret is effected.

55. In a machine of the class described, the combination of an expansible tree, and automatic mechanism normally inoperative but arranged to be rendered operative at the will of the workman for expanding said tree, said mechanism being constructed automatically to become inoperative again after the expansion of said tree has been effected.

56. In a machine of the class described, the combination of a turret carrying a plurality of expansible trees, mechanism for expanding said trees, said turret supporting said trees for movement into and out of operative relationship to said mechanism, and power driven mechanism including a yielding element to move said turret yieldingly step by step to present said trees one at a time to said expanding mechanism.

57. In a machine of the class described, the combination with an expansible tree adapted to hold a shoe, and tools for ironing the shoe, of automatically operating means for expanding the tree, automatically operating means for moving the expanded tree into position for the shoe thereon to be ironed by said tools, and means for actuating the tools to treat the shoe.

58. In a machine of the class described, the combination of a movable turret carrying a plurality of expansible trees, automatic mechanism operable while said turret is substantially stationary for expanding said trees one at a time and automatically operating means for moving said turret to present said trees one at a time to the operation of said expanding mechanism.

59. In a machine of the class described, a movably supported tree adapted to receive a shoe, means for expanding the tree to distend the shoe and for locking the tree in expanded condition, means for treating the distended shoe, and means for unlocking the tree to permit it to contract, combined with a driven member and means under control of the workman for connecting said tree to the driven member to cause the tree to be shifted from operative position with relation to one of said means into operative position with relation to another one of said means.

60. In a machine of the class described having a tree adapted to hold a shoe to be treated and tools for acting upon the shoe, yielding means for holding the tools normally in inoperative position with relation to the shoe, and means for shifting said tools into operative position, said shifting means comprising a driven member, a device having connection with said tools and normally out of operative position with relation to said driven member, and means under control of the workman for putting said device into operative position with relation to the driven member.

61. In a machine of the class described having a tree adapted to hold a shoe and tools for treating the shoe, means for holding the tools normally out of operative position with relation to the shoe, means under control of the workman for causing the tools to be moved into operative position, means for retaining the tools in such position, automatic means for releasing the tools, and means for actuating the tools away from operative position.

62. In a machine of the class described, the combination with a tree support, of a tree rotatably mounted thereon, a stud carried by the tree, and a latch pivotally mounted on the support and having a recessed end shaped to be engaged with the stud for restraining the rotary movement of the tree.

63. In a machine of the class described having a support for a shoe, a tool carrier mounted at each side of the shoe, separate groups of forepart and rearpart finishing tools mounted on each carrier, and means to actuate the carriers to move the tools over the shoe to do their work.

64. In a machine of the class described having a support for a shoe, a tool carrier mounted at each side of the shoe, separate groups of forepart and rearpart finishing tools mounted on each carrier, means to actuate the carriers to move the tools over the shoe, and means to actuate the tools relatively to their carriers as they travel over the shoe.

65. In a machine of the class described having a support for a shoe, a tool carrier mounted at each side of the shoe, separate groups of forepart and rearpart finishing tools mounted on each carrier, means to actuate the carriers to move the tools over the shoe, and means to impart separate positioning movements to the forepart and rearpart tools relatively to the shoe as they travel over the shoe.

66. A treeing machine comprising a rotatable head, a plurality of trees carried by said head, a ratchet rigidly connected with said head, a pawl coöperating with said ratchet, means controlled by the operator for reciprocating the pawl to move the ratchet and thereby to rotate the head and a yielding connection intermediate said means and pawl whereby the head is yieldingly rotated.

67. In a treeing machine the combination with an actuator and a tree arranged to be moved toward and from position to be expanded by said actuator, of locking and unlocking mechanism for said tree, and means normally stationary carried by a relatively fixed portion of the machine adapted to coöperate with the locking mechanism during a portion of the movement of the tree toward operative position with relation to said actuator for automatically unlocking the tree, said mechanism and said means being arranged to be automatically disengaged from each other during a further portion of said movement whereby the locking means is left in position to re-lock the tree when the tree is again expanded.

In testimony whereof I have signed my name to this specification in the presence of two subscribing witnesses.

JOHN S. HANSEN.

Witnesses:
ELIZABETH C. COUPE,
ARTHUR L. RUSSELL.